L. C. BROECKER & J. E. NELSON.
POWER TRANSMITTING ATTACHMENT FOR MOTOR VEHICLES.
APPLICATION FILED JUNE 27, 1917.
1,263,199.
Patented Apr. 16, 1918.
2 SHEETS—SHEET 1.
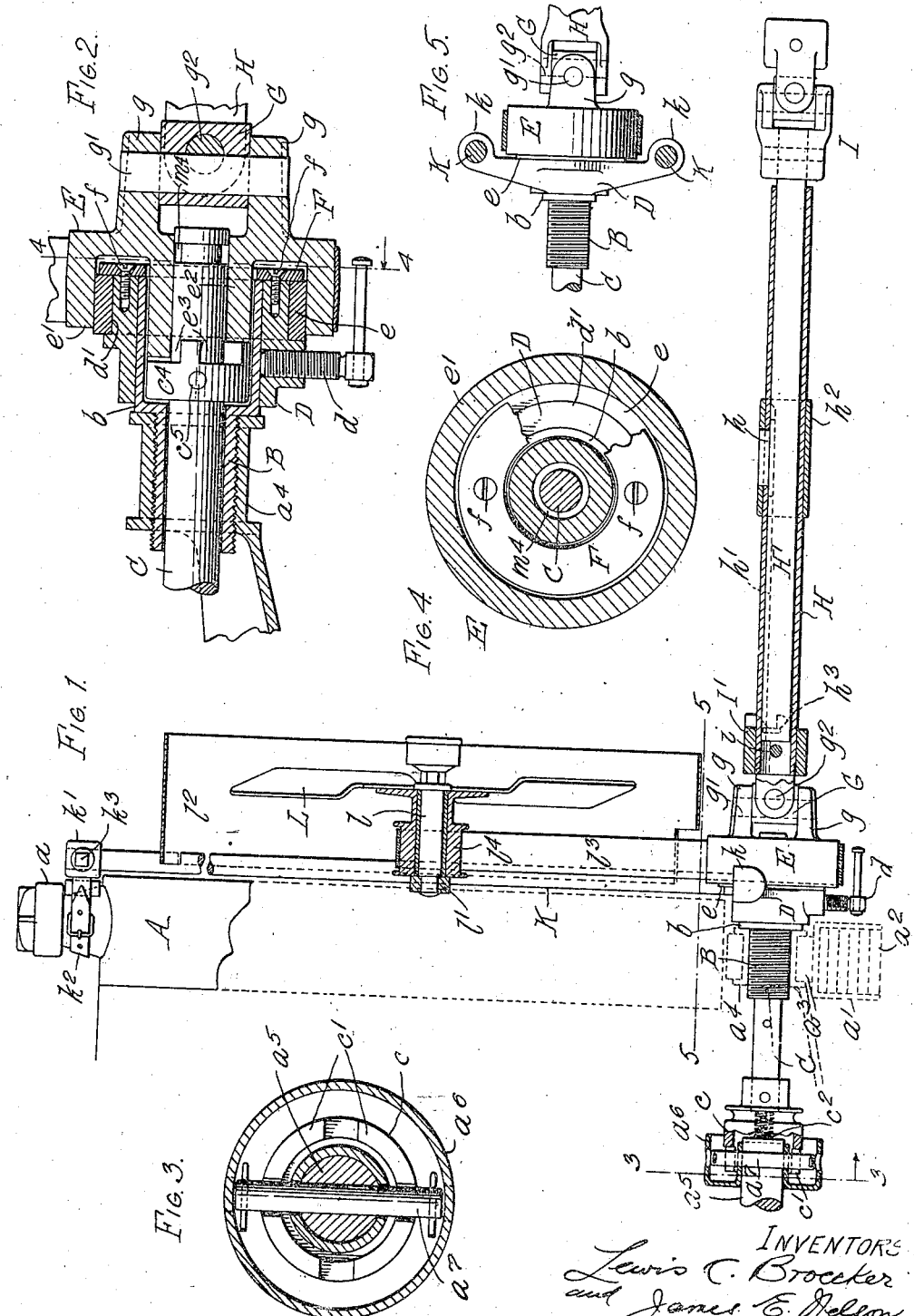
INVENTORS
Lewis C. Broecker
and James E. Nelson
by Wilhelm Parker
ATTORNEYS L. C. BROECKER & J. E. NELSON.
POWER TRANSMITTING ATTACHMENT FOR MOTOR VEHICLES.
APPLICATION FILED JUNE 27, 1917.
1,263,199.
Patented Apr. 16, 1918.
2 SHEETS—SHEET 2.
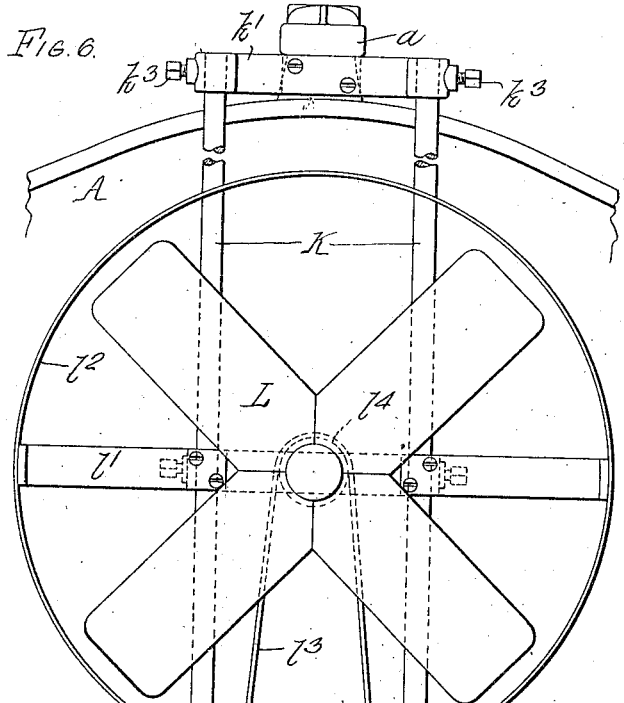
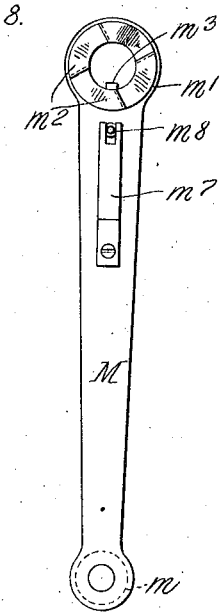
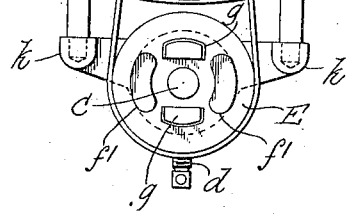
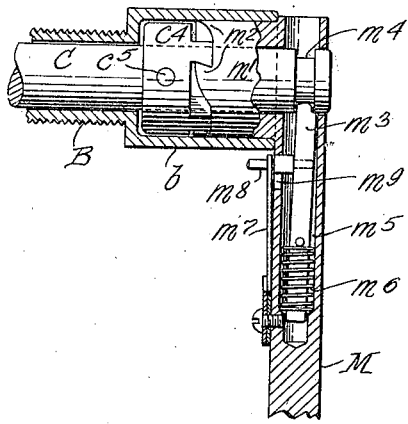
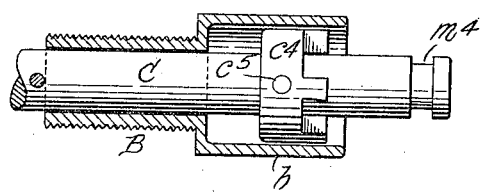
INVENTORS
Lewis C. Broecker,
and James E. Nelson,
by Wilhelm & Parker
ATTORNEYS

UNITED STATES PATENT OFFICE.

LEWIS C. BROECKER, OF EGGERTSVILLE, AND JAMES E. NELSON, OF LANCASTER, NEW YORK.

POWER-TRANSMITTING ATTACHMENT FOR MOTOR-VEHICLES.

1,263,199.  Specification of Letters Patent.  Patented Apr. 16, 1918.

Application filed June 27, 1917. Serial No. 177,368.

*To all whom it may concern:*

Be it known that we, LEWIS C. BROECKER and JAMES E. NELSON, citizens of the United States, residing at Eggertsville and Lancaster, respectively, in the county of Erie and State of New York, have invented a new and useful Improvement in Power-Transmitting Attachments for Motor-Vehicles, of which the following is a specification.

This invention relates to mechanisms adapted to be attached to motor vehicles for the purpose of transmitting power from the engine of a vehicle to the machinery or apparatus to be driven.

The objects of the invention are to provide a mechanism of this kind which can be easily and quickly attached to and removed from a motor vehicle and which will necessitate only a slight change in the vehicle to adapt the same to receive the power transmitting attachment; also to provide a mechanism of this kind which is so constructed as to avoid the necessity of accurately alining the vehicle with the machinery or apparatus to be driven; also to improve the construction of devices of this kind in other respects hereinafter specified.

In the accompanying drawings:

Figure 1 is a side elevation, partly in section, of a power transmitting mechanism embodying the invention showing the same in place on a motor vehicle.

Fig. 2 is a fragmentary longitudinal sectional elevation thereof on an enlarged scale.

Fig. 3 is a transverse sectional elevation thereof on line 3—3, Fig. 1.

Fig. 4 is a transverse sectional elevation thereof on line 4—4, Fig. 2.

Fig. 5 is a fragmentary plan view, partly in section, on line 5—5, Fig. 1.

Fig. 6 is a front elevation thereof.

Fig. 7 is a sectional elevation of the parts of the mechanism which may be permanently secured on the vehicle, the other parts of the mechanism being omitted.

Fig. 8 is an end view of a crank adapted to be used for starting the vehicle engine when the transmitting mechanism is removed from the vehicle.

Fig. 9 is a fragmentary sectional elevation showing the crank in position to start the engine.

A power transmitting mechanism embodying the invention is shown in the drawings as applied to a Ford automobile but it is understood that the invention is not limited to use in connection with cars of this make but may be used on any other kind of motor vehicle.

A represents the radiator arranged at the front end of the hood of an automobile and having a radiator cap $a$. The front end of the automobile, as shown, is supported on a frame member $a'$ to which the usual front spring $a^2$ is secured. $a^3$ represents a support secured on the frame member $a'$ which forms one of the points of suspension of the motor, the front end $a^4$ of the crank case or frame of the motor bearing in the support $a^3$. $a^5$, Fig. 1, represents the front end of an engine shaft on which is secured the usual fan belt pulley $a^6$ having a pin $a^7$ extending through the pulley and shaft for securing the pulley to the shaft $a^5$. The pin $a^7$ in cars as heretofore used coöperates with the usual crank (not shown) for starting the engine. All of these parts have heretofore been used in Ford cars and do not of themselves constitute a part of this invention.

In order to adapt the car for attaching the power transmitting mechanism thereto, the usual starting crank which coöperates with the pin $a^7$ of the fan pulley is removed from the vehicle and the front end $a^4$ of the crank case is adapted to receive a guide bushing B, being for that purpose provided, in the construction shown, with a screw-thread which is adapted to receive a screw-threaded portion of the guide bushing. A connecting spindle C extends through the bushing B and is provided at its rear end with a clutch or coupling member $c$ having teeth $c'$ adapted to engage with the pin $a^7$ of the fan pulley $a^6$, as shown in Figs. 1, and 3. A spring $c^2$, preferably arranged in the clutch member $c$, bears against the end of the shaft $a^5$ in such a manner that the spring $c^3$ will normally hold the clutch member $c$ out of engagement with the pin $a^7$ of the fan pulley. The connecting spindle is provided at its outer or front end with a second clutch or coupling member $c^4$ secured to the spindle by any suitable means, such as a pin $c^5$, and arranged in an enlarged portion $b$ of the guide bushing B. Both the guide bushing B and the connecting spindle C with the coupling members attached thereto are preferably permanently secured on a motor vehicle to adapt the same to be connected with a power transmitting mechanism. Any other means may be employed for operatively connecting the spindle with the motor shaft.

The detachable part of the power transmitting mechanism includes a bearing or supporting member D which may be suitably secured in a fixed position relatively to the motor of the vehicle in any suitable manner, for example, by means of a set screw $d$ engaging the outer portion of the guide bushing B. The bearing member D has a bearing portion $d'$ at the outer end thereof in which a bearing sleeve or ring $e$ of a driven member E is rotatably held. The bearing sleeve is preferably made of brass or other metal having a good bearing surface and may be secured to the driven member E in any suitable manner. In the construction shown for this purpose, the driven member E has a cup-shaped portion formed by an annular flange $e'$ which surrounds the outer end of the bearing member D and to the inner face of which the bearing ring $e$ is rigidly secured. The bearing ring $e$ and the driven member connected therewith are preferably held on the bearing portion $d'$ of the supporting or bearing member D by means of a ring or retaining flange F adapted to be secured to the supporting member D by suitable means, such as screws $f$ which may be secured in place through holes or openings $f'$, Fig. 6, formed in the driven member E. The driven member E is suitably connected with the spindle C, being provided for this purpose, in the construction shown, with a central tubular extension or hub portion $e^2$ having clutch teeth $e^3$ adapted to engage with the teeth of the clutch member $c^4$ when the driven member E is secured in its operative position by means of the ring F, the members being so proportioned that when the driven member E is held in its operative position by the ring F, the connecting spindle C will be pressed inwardly against the action of the spring $c^2$ to cause the clutch member $c$ thereof to engage with the pin $a^7$ of the fan pulley $a^6$.

Power may be transmitted by any suitable means from the driven member E to the machinery or apparatus to be driven. In the construction shown for this purpose, the driven member E is provided on its outer face with projecting portions $g$ forming a part of a universal joint which, in the construction shown, includes an intermediate member G connected with the projecting portions $g$ by means of a pin $g'$ and which in turn is connected by means of a pin $g^2$ to a shaft or the like to be driven. In order to facilitate the connecting of the engine with the apparatus or other device to be driven, the universal joint of the driven member is preferably connected with an expansible or telescopic shaft, including a tubular shaft member H connected by means of the pin $g^2$ with the intermediate member G of the universal joint. The tubular shaft member H is provided with a key $h$ slidably engaging in a key-way $h'$ formed in the shaft H' which is telescopically arranged in the tubular member H. The portion of the tubular shaft member in which the key is secured is preferably strengthened by means of a reinforcing tube $h^2$. A pin $h^3$ extending into the key-way $h'$ of the shaft H' limits the movement of the shaft lengthwise of the tubular member H. The outer end of the shaft H' is preferably connected to transmit power to a second universal joint I. By arranging the key $h$ approximately midway between the ends of the tubular member H and by providing a stop pin $h^3$ in the key-way of the shaft H' the extent to which the shaft H' can be drawn out of the tubular member H may be limited so that neither the key nor the key-way is exposed. By means of the two universal joints and the telescopic shaft the necessity for accurately alining the axis of the engine shaft with regard to the axis of the device to be driven is eliminated, so that no time need be wasted in connecting the motor with the device to be driven. Any other means may, however, be employed for transmitting power from the driven member E to the device to be driven. In order to enable the engine to be started by means of a crank when the power transmitting mechanism is in place on the automobile, a clutch member I' is preferably provided which, in the construction shown, is mounted on the tubular shaft member H by any suitable means, such as a pin $i$. The clutch member I' is provided with ratchet teeth adapted to be engaged by means of a spanner wrench or analogous device.

It is desirable to provide means for increasing the flow of air through the radiator when the power transmitting mechanism is in place on the vehicle, and the following construction is preferably employed for this purpose:

The supporting or bearing member D is provided at opposite sides with projecting portions $k$ to which upright fan supporting members or rods K may be secured. The upper ends of the supporting rods are connected to a cross-piece $k'$ which may be suitably secured to the radiator cap $a$ by any suitable means, such as a strap $k^2$, the cross-piece $k'$ being preferably adjustably secured to the upright rods K by means of set screws $k^3$. L represents a fan which is secured on a shaft $l$ suitably journaled on a cross-bar $l'$ secured on the upright fan supporting rods K, the ends of the cross-bar $l'$ supporting a frame or guard $l^2$ for the fan. The fan may be driven by any suitable means, a belt $l^3$ being shown in the construction illustrated which passes over a pulley $l^4$ secured on the fan shaft $l$ and over the outer face of the driven member E. Any other means for producing increased circulation of air through the radiator may be provided.

In order to enable the engine to be cranked when the power transmitting device is not in place thereon, a crank is provided which is adapted to engage the teeth of the clutch member $c^4$. The crank shown in the drawings for this purpose comprises the usual arm M having a handle $m$ at one end and having a hub portion $m'$ at the other end which is adapted to enter into the outer portion of the guide bushing B and which is provided with ratchet teeth $m^2$. The ratchet teeth $m^2$ are held in engagement with the teeth of the clutch member $c^4$ by means of a retaining bar or finger $m^3$ adapted to engage in an annular slot $m^4$ formed in the outer end of the connecting spindle C. The finger $m^3$ is arranged in a hollow portion $m^5$ of the crank arm M and is pressed outwardly to engage in the annular slot $m^4$ by means of a spring $m^6$ arranged in the crank arm. The hub portion $m'$ of the crank is yieldingly pressed into the bushing B to hold the ratchet teeth $m^2$ in engagement with the teeth of the clutch member $c^4$, by means of a spring $m^7$ engaging a pin $m^8$ secured on the finger $m^3$. In order to engage or disengage the crank from the connecting spindle C, the pin $m^8$ is moved toward the outer end of the arm M to withdraw the finger $m^3$ from engagement with the annular slot, and after the engine has been started, the clutch member $c^4$ can slip past the ratchet teeth of the crank by forcing the crank out against the action of the spring $m^7$. The movement of the finger $m^3$ is limited by means of a slot $m^9$ through which the pin $m^8$ extends and the pin $m^8$ is moved against the action of the spring $m^6$ by depressing the spring $m^6$ to secure the crank on or remove the same from the connecting spindle C.

The apparatus described has the advantage that it can be very easily attached to the vehicle, namely, by securing the supporting or bearing member D on the bushing B by means of the set screw $d$ and fastening the strap $k^2$ on the radiator cap, and can be removed from the vehicle with equal ease. The only difference in the appearance of the automobile is that the spindle C and the bushing B replace the usual crank or stud shaft of the vehicle. The automobile can be run by its own power into approximately the position which it is to occupy with regard to the apparatus and any difference in alinement can be readily overcome by means of the universal joints and the telescopic shaft. The shaft drive is much superior to a belt drive, which causes a side pull on the automobile and also requires very accurate positioning of the automobile with regard to the apparatus to be driven.

We claim as our invention:

1. In a power transmitting mechanism, the combination with a motor vehicle having a motor shaft and a motor frame, of a guide bushing fixed with regard to said motor frame, a connecting spindle arranged in said guide bushing and connected with said motor shaft, a driven member rotatably mounted on said bushing and engaging said connecting spindle, and means for transmitting power from said driven member.

2. In a power transmitting mechanism, the combination with a motor vehicle having a motor shaft and a motor frame, of a guide bushing fixed with regard to said motor frame, a connecting spindle arranged in said guide bushing and connected with said motor shaft, a bearing member secured on said guide bushing, and a driven member rotatably mounted on said bearing member and adapted to rotate thereon, said driven member having a driving connection with said spindle.

3. In a power transmitting mechanism, the combination with a motor vehicle having a motor shaft and a motor frame, of a guide bushing fixed with regard to said motor frame, a connecting spindle arranged in said guide bushing and connected with said motor shaft, a bearing member removably secured on said bushing, and a driven member journaled on said bearing member and having a driving connection with said spindle.

4. In a power transmitting mechanism, the combination with a motor vehicle having a motor shaft and a motor frame, a spindle connected with said motor shaft and extending to the front of the vehicle, a bearing member adapted to be removably secured in a fixed position with regard to said motor frame, a driven member journaled on said bearing member, and means for connecting said driven member and said spindle when said bearing member is secured in its operative position.

5. In a power transmitting mechanism, the combination with a motor vehicle having a motor shaft and a motor frame, a spindle connected with said motor shaft and extending to the front of the vehicle, a bearing member adapted to be removably secured in a fixed position with regard to said motor frame at the front of said vehicle and into which said spindle extends, and a driven member journaled on said bearing member and having a part adapted to form a driving connection with said spindle when said bearing member is secured in its operative position.

6. In a power transmitting mechanism, the combination with a motor vehicle having a motor shaft and a motor frame, of a guide bushing fixed with regard to said motor frame, a connecting spindle arranged in said guide bushing and connected with said motor shaft, a bearing member removably secured on said bushing, a driven member journaled on said bearing member and having a driving connection with said spindle, and a retaining flange removably secured on said bearing member for holding said driven member thereon and for holding said driven member in engagement with said connecting spindle.

7. In a power transmitting mechanism, the combination with a motor vehicle having a motor shaft and a motor frame, of a guide bushing fixed with regard to said motor frame, a connecting spindle arranged in said guide bushing, a clutch member on said spindle adapted to engage a corresponding clutch member on said motor shaft, a driven member rotatably mounted on said bushing and engaging said connecting spindle, and means for holding said driven member in operative position on said spindle.

8. In a power transmitting mechanism, the combination with a motor vehicle having a motor shaft and a motor frame, of a guide bushing fixed with regard to said motor frame, a connecting spindle arranged in said guide bushing, a clutch member on said spindle adapted to engage a corresponding clutch member on said motor shaft, a driven member rotatably mounted on said bushing and engaging said connecting spindle, a flange removably secured to hold said driven member on said bushing and which holds said clutch members in engagement for transmitting power from the motor shaft to said driven member.

9. In a power transmitting mechanism, the combination with a motor vehicle having a motor shaft and a motor frame, of a guide bushing fixed with regard to said motor frame, a connecting spindle arranged in said guide bushing and connected with said motor shaft, a driven member rotatably mounted on said bushing, and a retaining flange removably securing said driven member on said bushing, said retaining flange when in operative position holding said driven member in connection with said connecting member.

10. In a power transmitting mechanism, the combination with a motor vehicle having a motor shaft and a motor frame, of a guide bushing fixed with regard to said motor frame, a connecting spindle arranged in said guide bushing and connected with said motor shaft, a driven member rotatably mounted on said bushing, a clutch member mounted on said connecting spindle, clutch teeth formed on said driven member, and a removable retaining flange for holding said driven member on said bushing and for holding said clutch teeth in engagement with said clutch member.

11. In a power transmitting mechanism, the combination with a motor vehicle having a motor shaft and a motor frame, of a guide bushing fixed with regard to said motor frame, a connecting spindle arranged in said guide bushing and connected with said motor shaft, a driven member rotatably mounted on said bushing and engaging said spindle, said driven member having an annular flange, a bearing ring secured in said annular flange, and a retaining flange fixed with regard to said bushing and engaging said bearing ring to hold said driven member on said bushing.

12. In a power transmitting mechanism, the combination with a motor vehicle having a motor shaft and a motor frame, of a guide bushing fixed with regard to said motor frame, a connecting spindle arranged in said guide bushing and connecting with said motor shaft, a driven member rotatably mounted on said bushing and engaging said spindle, said driven member having an annular flange, a bearing member mounted on said bushing and on which the inner face of said annular flange bears, and a retaining ring secured to said bearing member and holding said driven member in place thereon.

13. In a power transmitting mechanism, the combination with a motor vehicle having a motor shaft and a motor frame, of a connecting spindle arranged at the front end of said motor vehicle and adapted to be coupled to said motor shaft, means for yieldingly holding said connecting spindle out of engagement with said motor shaft, a driven member journaled on the front of said vehicle and adapted to be operatively connected with said spindle, and means for holding said driven member in engagement with said connecting spindle to press said connecting spindle into engagement with said motor shaft.

14. In a power transmitting mechanism, the combination with a motor vehicle having a motor shaft and a motor frame, of a connecting spindle arranged at the front end of said motor vehicle and adapted to be coupled to said motor shaft, means for yieldingly holding said connecting spindle out of engagement with said motor shaft, a bearing member adapted to be removably secured at the front end of the vehicle, a driven member journaled on said bearing member and having parts adapted to operatively connect said driven member with said spindle, and means for removably supporting said bearing member in operative relation to said spindle, said means, when secured in operative position, pressing said driven member into engagement with said spindle and pressing said spindle into engagement with said motor shaft.

15. In a power transmitting mechanism, the combination with a motor vehicle having a motor shaft and a motor frame, of a guide bushing secured on said motor frame, a connecting spindle arranged in said guide bushing and adapted to be coupled to said motor shaft, means for yieldingly holding said connecting spindle out of engagement with said motor shaft, a bearing member adapted to be removably secured to said guide bushing, and a driven member journaled on said bearing member and having parts adapted to operatively connect said driven member with said spindle, said bearing member when secured on said bushing placing said driven member into engagement with said spindle and pressing said spindle into connection with said motor shaft.

16. In a power transmitting mechanism, the combination with a motor vehicle having a motor shaft and a motor frame, of a connecting spindle arranged in the front end of said motor vehicle and connected with said motor shaft, a driven member adapted to be rotatably mounted on the front of said vehicle and engaging said connecting spindle, a telescopic shaft, a universal joint connecting said telescopic shaft and said driven member, and a universal joint at the other end of said telescopic shaft.

17. In a power transmitting mechanism, the combination with a motor vehicle having a motor shaft and a motor frame, of a guide bushing fixed with regard to said motor frame, a connecting spindle arranged in said guide bushing and connected with said motor shaft, a driven member rotatably mounted on said bushing and engaging said connecting spindle, a telescopic shaft, a universal joint connecting one end of said telescopic shaft and said driven member, and a universal joint at the other end of said shaft.

18. In a power transmitting mechanism, the combination with a motor vehicle having a motor shaft and a motor frame, of a connecting spindle arranged at the front end of said vehicle and connected with said motor shaft, a driven member rotatably mounted on said motor frame and engaging said connecting spindle, a tubular member, a universal joint connecting said tubular member and said driven member, and a shaft splined in said tubular member.

19. The combination with a motor vehicle having a motor shaft, a motor frame and a radiator, of a connecting spindle arranged at the front end of said vehicle and connected with said motor shaft, a rotatably mounted driven member engaging said connecting spindle and arranged in front of the motor vehicle, a fan arranged in front of the radiator for passing a current of air through said radiator, a belt connecting said driven member with said fan, and means for delivering power from said driven member.

20. The combination with a motor vehicle having a motor shaft, a motor frame and a radiator, of a connecting spindle arranged at the front of said vehicle and connected with said motor shaft, a bearing member removably mounted on said motor frame, a driven member journaled on said bearing member, a fan arranged in front of said radiator for passing a current of air through said radiator, a frame for said fan supported on said bearing member, and means connecting said fan and said driven member for driving the fan.

21. The combination with a motor vehicle having a motor shaft, a motor frame and a radiator, of a guide bushing fixed with regard to said motor frame, a connecting spindle arranged in said guide bushing and connected with said motor shaft, a bearing member secured on said bushing, a driven member journaled on said bearing member and engaging said connecting spindle, a fan for passing a current of air through said radiator, a supporting frame for said fan, and laterally extending supporting arms on said bearing member to which the frame of said fan is secured and means for driving said fan from said driven member.

Witness our hands, this 25th day of June, 1917.

LEWIS C. BROECKER.
JAMES E. NELSON.

Witnesses:
F. E. PROCHNOW,
A. L. MCGEE.